(12) United States Patent
Noll et al.

(10) Patent No.: US 7,451,446 B2
(45) Date of Patent: Nov. 11, 2008

(54) TASK SUPERVISION

(75) Inventors: Stefan Noll, Laatzen (DE); Alexander Wassew, Buxtehude (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 888 days.

(21) Appl. No.: 10/477,509

(22) PCT Filed: May 14, 2002

(86) PCT No.: PCT/EP02/05289

§ 371 (c)(1),
(2), (4) Date: May 5, 2004

(87) PCT Pub. No.: WO02/093374

PCT Pub. Date: Nov. 21, 2002

(65) Prior Publication Data

US 2004/0216110 A1 Oct. 28, 2004

(30) Foreign Application Priority Data

May 14, 2001 (EP) .................................. 01111705

(51) Int. Cl.
G06F 9/46 (2006.01)
G06F 17/00 (2006.01)
G06F 11/00 (2006.01)
G06N 5/00 (2006.01)

(52) U.S. Cl. ........................... 718/102; 706/45; 706/48; 714/25; 714/48; 714/100

(58) Field of Classification Search ............ 714/25–26, 714/37, 47–48, 45, 100; 718/100, 102; 706/20, 706/45–48

See application file for complete search history.

(56) References Cited

U.S. PATENT DOCUMENTS

| 4,318,173 | A | * | 3/1982 | Freedman et al. ........... 718/103 |
| 4,323,966 | A | * | 4/1982 | Whiteside et al. .............. 714/1 |
| 4,356,546 | A | * | 10/1982 | Whiteside et al. ............. 714/10 |
| 5,621,663 | A | * | 4/1997 | Skagerling ................... 702/186 |
| 5,844,795 | A | * | 12/1998 | Johnston et al. ................ 700/83 |
| 6,154,859 | A | * | 11/2000 | Norizuki et al. ............... 714/47 |
| 6,223,201 | B1 | * | 4/2001 | Reznak ....................... 718/102 |
| 2002/0082886 | A1 | * | 6/2002 | Manganaris et al. ........... 705/7 |

OTHER PUBLICATIONS

Takahashi, S. et al., "Trace Visualization and Analysis, Tool for Supervisory Control System" Systems, Man, and Cybernetics, 2000 IEEE International Conference in Nashville, TN USA on Oct. 8-11, 2000, Piscataway, NJ, USA IEEE, US Oct. 8, 2000, pp. 1198-1203, XP010524818. ISBN: 0-7803-6583-6.

* cited by examiner

*Primary Examiner*—Thomas Lee
*Assistant Examiner*—Qing-Yan Wu

(57) ABSTRACT

The invention relates to a method for supervising a task-based data processing, wherein for a plurality of tasks the following steps are performed for each task: scheduling the task for processing, and logging the scheduling of the task by storing a task identifier in a log memory, said task identifier identifying the scheduled task and being assigned to the scheduled task. The task identifiers stored in the log memory form a task history pattern of scheduled tasks. By means of the task history pattern is detected, whether a failure appears in the task-based data processing. At least one safety measure is taken when a failure is detected. The invention relates further to a corresponding network element, communications system and computer program.

16 Claims, 3 Drawing Sheets

FIG. 4 healthy scenario
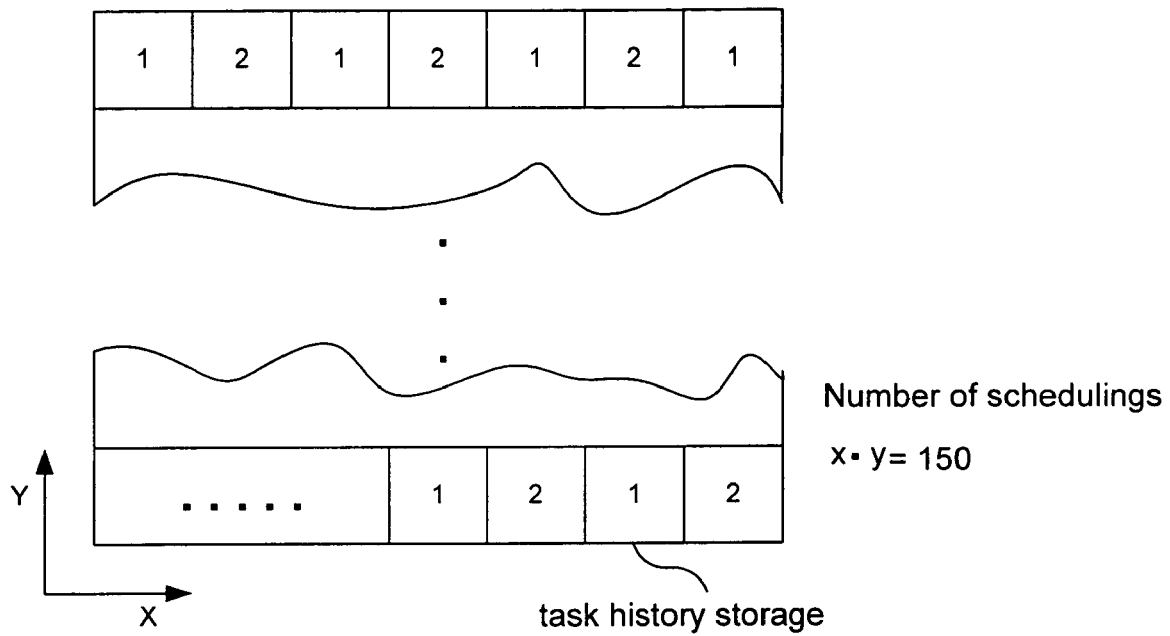
Number of schedulings
$x \cdot y = 150$
task history storage
FIG. 5 faulty scenario
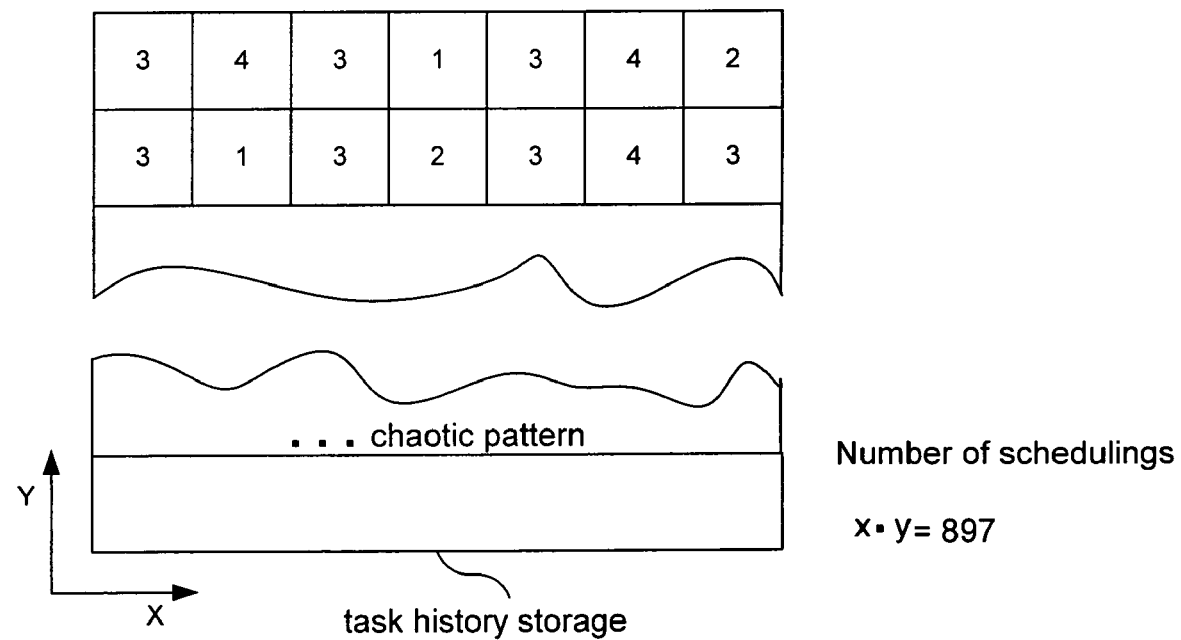
... chaotic pattern
Number of schedulings
$x \cdot y = 897$
task history storage

TASK SUPERVISION

The invention addresses the field of data processing. It relates to a method, device and computer program for task supervision, in particular for use in a in a real time telecommunication system.

BACKGROUND OF THE INVENTION

Computer operation systems, in particular real time operation systems RTOS are known which provide a task-based data processing. A task is a work element of a computer processing job. A task can represent a single activity to be processed by a processor of a computer or computer system, or it can be a process comprising a plurality of sub-processes to be processed in the computer or computer system. A task can therefore be called a thread or a process as well.

In order to be processed, tasks are scheduled by the operation system. The term 'scheduling a task' as used in the following comprises the meaning of 'calling for direct processing' as well as 'planning a task for processing', e.g. by means of a queue or a task list. In the latter case the task might have to wait for the processing until other tasks being scheduled for earlier processing, e.g. due to their higher priority, are processed. In the latter case is it furthermore possible to re-schedule a task, i.e. to arrange an already scheduled task for an earlier or later processing.

In particular real time systems provide for a task supervision, i.e. a monitoring of the scheduled tasks, in order to detect failures. A known task supervision in existing systems is done by means of a high prioritised supervising task. Messages, called supervision messages, are sent from supervised tasks to the supervising task. The supervising task monitors dedicated timeouts for expected supervision messages. In the case of a timeout knows the supervising task that something has gone wrong and can take appropriate actions.

Figure 1:
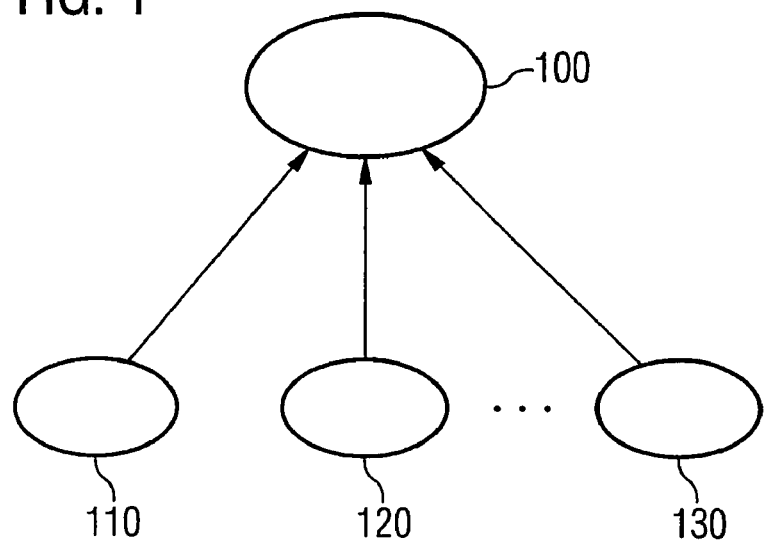
Figure 2:
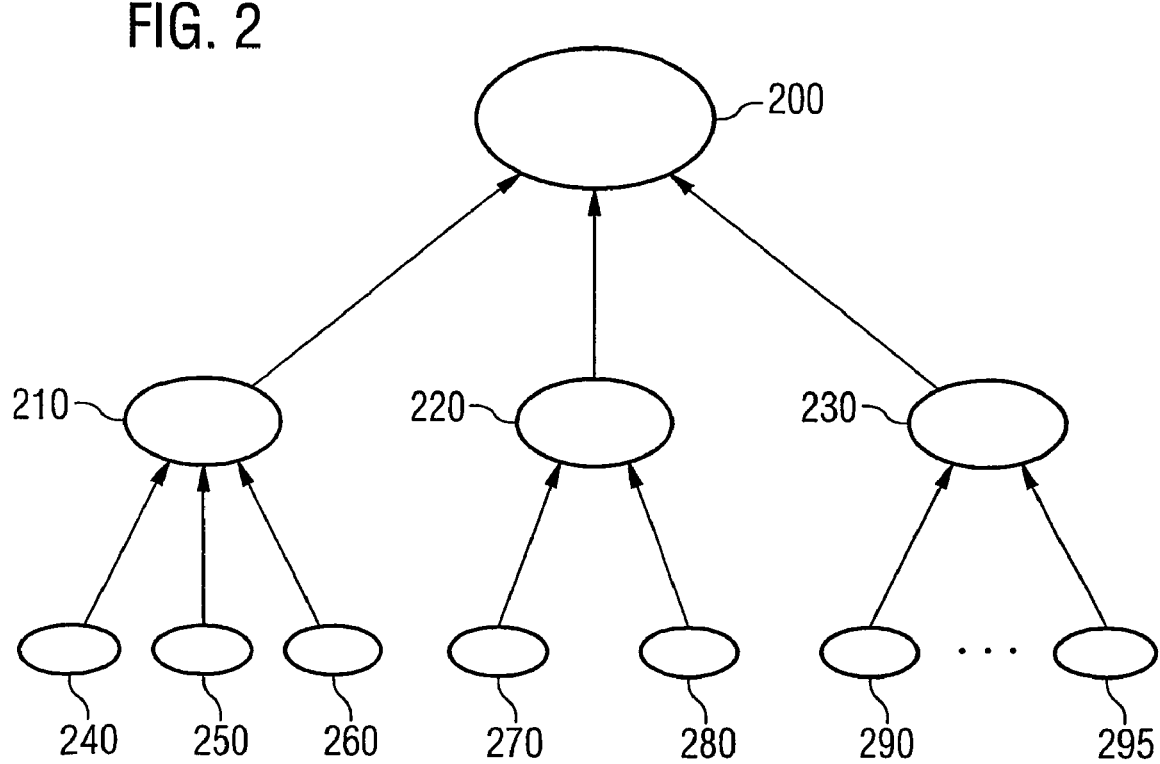

Common supervisor hierarchies are illustrate in FIG. 1 and FIG. 2. FIG. 1 shows a central supervisor SV 100 monitoring the tasks 'task 1' 110, 'task 2' 120 to 'task n' 130. FIG. 2 shows a supervision tree comprising at the root a supervisor SV 200 connected to medium layered supervisors SV1 210, SV2 220 and SV3 230. The tasks 'task 1' 240, 'task2' 250 and 'task 3' 260 send their supervision messages to the supervisor SV1 210. Supervisor SV2 220 receives supervision messages from 'task 4' 270 and 'task 5', and supervisor SV3 230 gets supervision messages from 'task6' 290 to 'task n' 295. Any medium layered supervisor 210, 220, 230 sends supervision messages to the root supervision SV 200.

Tasks can have different priorities. Often, the scheduling is done in real-time systems according priorities only, in order to meet the real-time requirements.

Usually, a monitoring of the task scheduling is necessary because several problems can appear: A task can become unavailable to the system due to a crash of this task. A task can become unavailable to the system due to an endless loop in it. A task can become unavailable to the system due to a dead lock, i.e. a blocking situation that can e.g. appear during a competition of tasks for a limited system resource. Tasks can become unavailable to the system due to a life lock. A life lock is either an endless loop of one task, or a communication between two or more tasks in a faulty, infinite way. By this other tasks are unable to get processed by the processor (CPU). Or, the faulty tasks miss to trigger other tasks, so these other tasks will not be executed anymore.

Low prioritised tasks can become unavailable to the system due overload caused by one or several better prioritised others. This might happen actually due to shortcomings in the design of the task processing system, because in a proper design will a task not prevent other important, but lower prioritised tasks from being executed, even under overload situations.

Usually not all tasks in a system are part of the application. Instead, some are part of a system's platform. Usually, the source code of such platform tasks cannot be changed.

With supervision messages it is hard to find out what exactly went wrong in the case of failure, i.e. which task or tasks failed. If tasks become unavailable due to a life lock or overload as described, a supervisor monitoring the task scheduling by means of supervision messages can detect only that one of the worse prioritised tasks are dead, but cannot determine that there is a life lock or overload, although it is important for the supervisor to detect what went wrong, in order to start appropriate actions to solve the problem.

As a further disadvantage, it is impossible to include platform tasks in a supervision hierarchy as described with reference to the FIGS. 1 and 2, unless the platform offers certain interfaces, which might cause extra costs or which might in particular in security-related systems not be wanted Therefore, it is an object of the invention to provide a method, device and computer program for improved task supervision in a task-based data processing system.

SUMMARY OF THE INVENTION

This object is solved by the teaching of the independent claims.

The invention relates to a method for supervising a task-based data processing, wherein for a plurality of tasks the following steps are performed for each task: scheduling the task for processing, and logging the scheduling of the task by storing a task identifier in a log memory, said task identifier identifying the scheduled task and being assigned to the scheduled task. The task identifiers stored in the log memory form a task history pattern of scheduled tasks. By means of the task history pattern it is evaluated, whether a failure appears in the task-based data processing. At least one safety measure is taken when the evaluation indicates a failure.

In a further aspect relates the invention to a network element of a communication network adapted to perform the described method for supervising a task-based data processing.

In another aspect relates the invention to a communications network comprising at least one network node adapted to perform the described method for supervising a task-based data processing.

In another aspect relates the invention to a computer program, in particular a computer operation system, comprising software code portions loadable into an internal memory of a digital processing unit and adapted to control the steps the described method for supervising a task-based data processing, when the computer program is executed on the digital processing unit.

Advantageously, the invention allows for a detection of life locks and overloaded tasks. Furthermore, the invention allows the detection, whether a single task is in an endless loop.

It is furthermore an advantage that the design is simple and therefore reliable, because the supervision can be handled by a single supervisor task. In addition, only a task scheduler needs to provide information about scheduled tasks. High volumes of signalling traffic, e.g. caused by supervising messages, are avoided. In addition, the supervised tasks do not need to be changed in order to apply to the invention.

Further preferred embodiments of the invention are described in the dependent claims.

In a preferred embodiment comprises the task identifier at least one dedicated parameter of the scheduled task. Advantageously, the scheduler can include any available information relevant for the task supervision into the parameter. The task supervision system can therefore use available information about tasks efficiently.

In a further embodiment is the at least one dedicated parameter one of a group comprising a task priority, a required processing time, a consumed processing time, a processing deadline, a task type indicator. Advantageously, the listed parameters allow for a differentiated and detailed task supervision in particular for real-time systems, as they reflect time constraints that can be critical during task processing.

In a further embodiment comprises the step of evaluating the step of comparing the task history pattern with at least one predefined criterion. Advantageously, the use of predefined criterions allow for an adaptation of the task supervision to individual needs of an application.

In another embodiment is the at least one predefined criterion from a group of criterions, said group comprising the criterion that a dedicated task identifier does not appear in the task history, the criterion that a plurality of dedicated task identifiers do not appear in the task history, the criterion that a number of scheduled tasks is lower than a first threshold, the criterion that a number of scheduled tasks is higher than a second threshold, the criterion that the number of schedulings of a dedicated task is higher than a third threshold, the criterion that the number of schedulings of a dedicated task is higher than a fourth threshold, the criterion that the number of schedulings of a plurality of dedicated tasks is higher than a fifth threshold, and any combination criterions of the group of criterions.

Advantageously, the criterions of the group reflect failure scenarios, which are useful to be detected by the task supervision.

In another embodiment of the invention represents a predefined criterion a reference pattern, and a failure is determined if the task history pattern and the reference pattern match.

A reference pattern is to be understood as a set of conditions, which are checked against the task history pattern. In an alternative embodiment, the task history pattern and the reference pattern are represented by bit pattern, which can be easily, fast and effective compared and evaluated by corresponding bit-operations, e.g. by means of an XOR-function.

The failure detection in the case of a pattern match provides an effective task supervision, if the reference pattern consists of critical conditions, and if the number of available critical scenarios, i.e. indicating a failure, is lower than the number of healthy scenarios, i.e. not indicating a failure.

In another embodiment represents the predefined criterion a reference pattern, and a failure is determined if the task history pattern and the reference pattern mismatch.

The failure detection in the case of a pattern mismatch provides an effective task supervision, if the reference pattern consists of uncritical conditions, and if the number of available critical scenarios, i.e. indicating a failure, is higher than the number of healthy scenarios, i.e. not indicating a failure.

In a further embodiment comprises the reference pattern comprises at least one of a group of at least one task identifier of a task which is to be supervised, at least one priority information about at least one task to be supervised, at least one idle pattern, at least one healthy load pattern.

In a further embodiment comprises the safety measure the release of an alarm.

In a further embodiment is at least one reference measures assigned to the at least one predefined criterion, and the at least one taken safety measure is corresponds to the at least one reference measure that is assigned to the predefined criterion which caused the detection of the failure. An immediate action against a failure is supported by the linking of failure condition and countermeasure.

In a further embodiment is the step of detecting repeatedly performed, and the log memory is cleared at least after one performed step of detection. This allows to keep the needed memory space in reasonable limits.

In another embodiment is the scheduling of the task performed by means of a call back function. This allows for an easy and reliable handover of the task identifier and relevant task parameters for the purpose of being logged in the log memory.

In another embodiment relates the invention to a computer program that is stored on a computer-readable medium.

Figure 3:
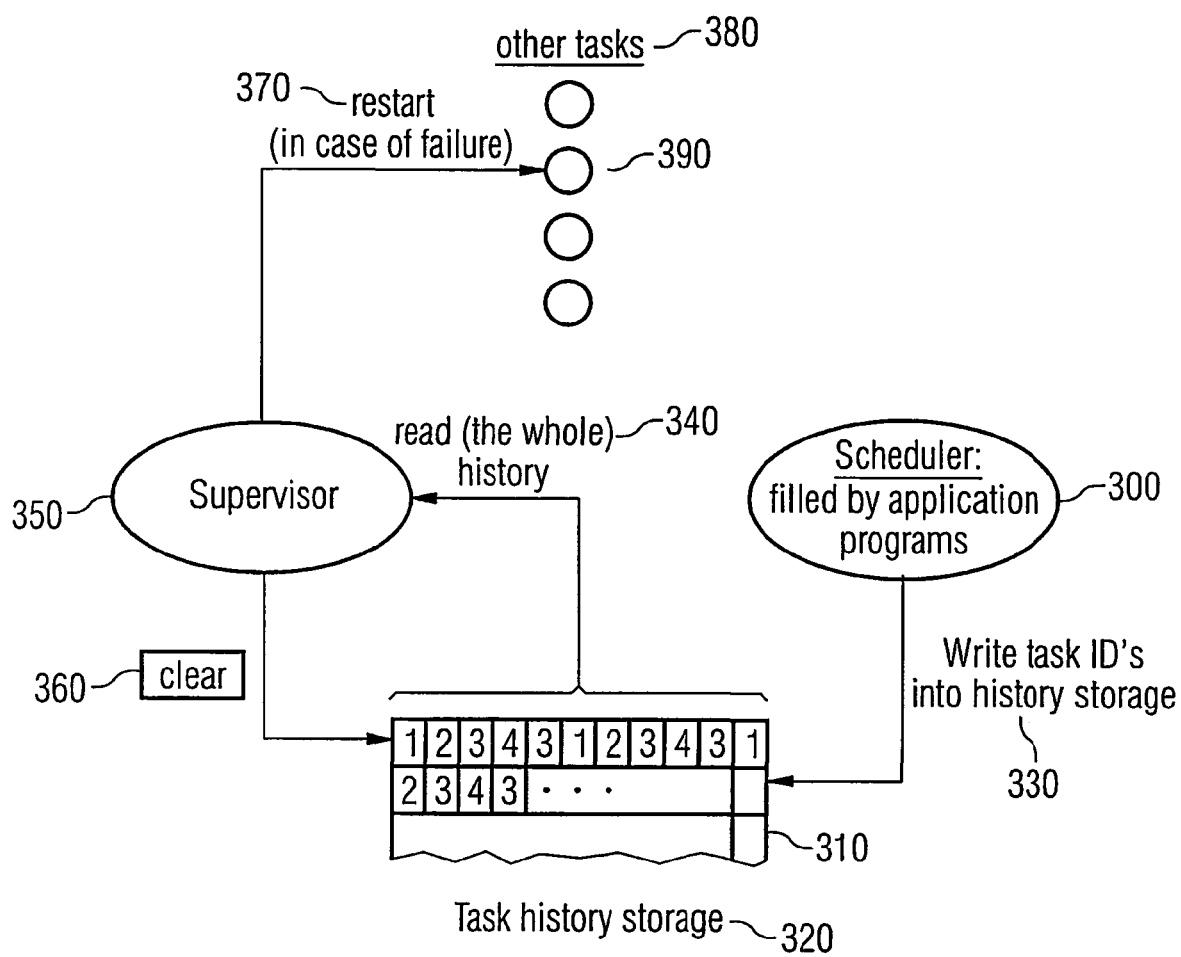

In the following are detailed embodiments of the invention described with reference to the figures, which show:

FIG. 1 a known supervisor hierarchy,

FIG. 2 a further known supervisor hierarchy,

FIG. 3 an illustration of the task supervision,

FIG. 4 a task history pattern indicating a faulty scenario,

FIG. 5 a task history scenario indicating a healthy scenario.

DETAILED DESCRIPTION OF EMBODIMENTS OF THE INVENTION

According to the invention logs a scheduler of a task-based software system the tasks to be activated, i.e. the scheduled tasks, in a log memory. Alternatively or in addition, the scheduler can also log tasks which are deactivated, or which are re-scheduled. A high-prioritised supervisor task regularly evaluates the pattern stored in this log. Evaluation means to compare the pattern against predefined criterions, which indicate a certain fault.

Criterions are:

one or more tasks do not appear in the pattern, the number of schedulings is much lower than expected; this can be measured by means of a certain threshold, the number of schedulings is much higher than expected, this can be measured by means of another certain threshold, one or more tasks are scheduled more often than expected; this can be measured by means of one or more further certain thresholds.

The listed criterions can be combined in any way to define the conditions, under which the task supervision shall indicate a failure.

Real time operation systems RTOS provide a 'call back' function performed from the scheduler. By this it is possible that an application function is called by the scheduler during every scheduling cycle. According to the invention, this function can be used to pass parameters like task identifiers or task names of tasks scheduled by the scheduler as parameters to an application function. The called application function logs the passed task scheduling information to a memory position. Therefore, from that memory can a task history, also called task history pattern, be red by the supervisor.

These steps of the task supervision are shown in FIG. 3.

The supervisor can do the following actions upon the task history:

Reading and evaluating it,

Logging and/or printing it out if something is detected by the evaluation as faulty or suspicious, Clearing the history, preferably after each supervision check to support an effective use of the memory.

In the described example knows the supervisor task the following: the tasks to supervise and their corresponding task identifiers, the priorities of the tasks, an idle pattern defined by a number of schedulings and by the identifiers of the tasks involved in the idle mode, and a healthy load pattern defined by a number of schedulings and by the identifiers of the tasks involved in the non-critical healthy mode.

With Reference to FIG. 4 and FIG. 5 is an example described of how the supervisor task detects a task in an endless loop. The example is based on the following assumptions: 4 tasks are to be supervised, The first task has the task identifier '1', the seconde task the task identifier '2' etc. Task1 has the highest priority, followed by task 2. Task 3 has a worse priority than task 2, and task 4 has the worst priority. There is an idle scenario where only task 3 and task 4 are running, with about 200 expected schedulings/sec. A healthy load scenario has about 1000 expected schedulings/sec. All 4 tasks get scheduled in a healthy load scenario.

FIG. 4 shows a faulty scenario. The supervisor finds out just by evaluating the number of tasks that have been scheduled and logged in the task history pattern (i.e. 150 entries in the history) that something is going wrong. It can even point out, what is going on, because task 3 and task 4 are missing completely. This indicates that task 2 is in an endless loop, just interrupted by the higher prioritised task 1. Alternatively, task 1 and task 2 can have ended up in a life lock. The supervisior therefore can trigger a safety measure to overcome the faulty task processing, e.g. by means of a restart of task 2.

A corresponding healthy scenario is shown in FIG. 5, wherein the task history pattern comprises of a random distribution, on other words a chaotic collection, of the task identifiers '1' to '4'. There are 897 schedulings logged. A comparison with the criterions outlined for a healthy pattern confirms a regular operation of the task-based data processing.

In one embodiment is the invention realised by software. In a further preferred embodiment the computer program is stored on a computer readable medium like a CD-ROM, a floppy disc, optical disc or hard disk. Therefore, a good physical portability of the control software is provided, i.e. upgrades can be performed in an easy way.

In another embodiment the method according to the present invention is performed by a network element of a communication system, e.g. a Mobile switching center MSC, a packet MSC, a SGSN or a Home Location register.

In one embodiment refers the invention to a data processing method having the steps of logging of tasks to be activated or deactivated by a scheduler, evaluating pattern in the task log by comparing the logged pattern against predefined criterions, indicating a fault if the evaluation results in a pattern mismatch.

Without being limited to, the invention can be used preferably in all communications systems as defined by 3GPP in the release 99 as well as in all future releases thereof. In particular, this includes PDC and PPDC as well as UMTS networks, core networks, GSM networks and the corresponding user equipment.

The invention claimed is:

1. A method for task supervision, wherein for a plurality of tasks the following step is performed for each task:

scheduling the task for processing;

logging the task scheduling by storing a task identifier in a log memory, said task identifier comprising at least one dedicated parameter of the scheduled task, the at least one dedicated parameter being one of a group comprising a task priority, a required processing time, a consumed processing time, a processing deadline, and a task type indicator;

identifying the scheduled task with the task identifier assigned to the scheduled task, wherein the task identifiers stored in the log memory form a task history pattern of scheduled tasks;

evaluating the task history pattern to determine whether a failure appears in the task-based data processing, wherein evaluating the task history pattern comprises comparing the task history pattern with at least one predefined criterion representing a reference pattern;

determining a failure if the task history pattern and the reference pattern match; and taking at least one safety measure if the evaluation indicates a failure.

2. The method according to claim 1, wherein the at least one predefined criterion is from a group of criterions, said group comprising the criterion that a dedicated task identifier does not appear in the task history, the criterion that a plurality of dedicated task identifiers does not appear in the task history, the criterion that a number of scheduled tasks is lower than a first threshold, the criterion that a number of scheduled tasks is higher than a second threshold, the criterion that the number of schedulings of a dedicated task is higher than a third threshold, the criterion that the number of schedulings of a dedicated task is higher than a fourth threshold, the criterion that the number of schedulings of a plurality of dedicated tasks is higher than a fifth threshold, and any combination of criterions of the group of criterions.

3. The method according to claim 1, wherein the at least one predefined criterion represents a reference pattern, and wherein a lure is determined if the task history pattern and the reference pattern mismatch.

4. The method according to claim 3, wherein the reference pattern comprises at least one of a group of at least one task identifier of a task which is to be supervised, at least one priority information about at least one task to be supervised, at least one idle pattern, and at least one healthy load pattern.

5. The method according to claim 1, wherein the safety measure comprises the release of an alarm.

6. The method according to claim 1 wherein at least one reference measure is assigned to the at least one predefined criterion, and wherein the at least one taken safety measure corresponds to the at least one reference measure that is assigned to the predefined criterion which caused detection of the failure.

7. The method according to claim 6, wherein the step of detecting is repeatedly performed, and wherein the log memory is cleared at least after one performed step of detection.

8. The method according to claim 1, wherein the scheduling of the task is performed by means of a call back function.

9. A network node for task supervision, comprising:
a scheduler for scheduling a task for processing;
a database for logging the task scheduling by storing a task identifier in a log memory, said task identifier comprising at least one dedicated parameter of the scheduled task the at least one dedicated parameter being one of a group comprising a task priority, a required processing time, a consumed processing time, a processing deadline and a task type indicator;
means for identifying the scheduled task with the task identifier assigned to the scheduled task, wherein the task identifiers stored in the log memory form a task history pattern of scheduled tasks;
means for evaluating the task history pattern to determine whether a failure appears in the task-based data processing, wherein means for evaluating the task history comprises
means for comparing the task history pattern with at least one predefined criterion representing a reference, a failure being determined if the task history pattern and the reference pattern match; and
means for taking at least one safety measure if the evaluation indicates a failure.

10. The network node according to claim 9, wherein the at least one predefined criterion is from a group of criterions, said group comprising:
the criterion that a dedicated task identifier does not appear in the task history,
the criterion that a plurality of dedicated task identifiers does not appear in the task history,
the criterion that a number of scheduled tasks is lower than a first threshold,
the criterion that a number of scheduled tasks is higher than a second threshold,
the criterion that the number of schedulings of a dedicated task is higher than a third threshold,
the criterion that the number of schedulings of a dedicated task is higher than a fourth threshold,
the criterion that the number of schedulings of a plurality of dedicated tasks is higher than a fifth threshold, and
any combination of criterions of the group of criterions.

11. The network node according to claim 9, wherein the at least one predefined criterion represents a reference pattern, and wherein a failure is determined if the task history pattern and the reference pattern mismatch.

12. The network node according to claim 11, wherein the reference pattern comprises at least one of a group of
at least one task identifier of a task which is to be supervised,
at least one priority information about at least one task to be supervised,
at least one idle pattern, and
at least one healthy load pattern.

13. The network node according to claim 9, wherein the at least one safety measure comprises release of an alarm.

14. The network node according to claim 9, wherein at least one reference measure is assigned to the at least one predefined criterion, and wherein the means for taking at least one safety measure confirms correspondence to the at least one reference measure that is assigned to the predefined criterion which caused detection of the failure.

15. The network node according to claim 14, wherein the evaluation means repeatedly performs evaluation of the task history pattern, and wherein the log memory is cleared at least after one performed step of evaluation.

16. The network node according to claim 9, wherein a call back function performs the scheduling of the task.

* * * * *